US006671959B1

(12) United States Patent
Skaggs

(10) Patent No.: US 6,671,959 B1
(45) Date of Patent: Jan. 6, 2004

(54) TOOL FOR EXTRACTING A BEARING

(76) Inventor: Michael D. Skaggs, 4986 Wolfchase Farms Pkwy., Arlington, TN (US) 38002

( * ) Notice: Subject to any disclaimer, the term of this patent is extended or adjusted under 35 U.S.C. 154(b) by 0 days.

(21) Appl. No.: 10/179,559

(22) Filed: Jun. 25, 2002

Related U.S. Application Data

(60) Provisional application No. 60/304,106, filed on Jul. 10, 2001.

(51) Int. Cl.[7] .......................... B21D 53/10; B23P 19/04

(52) U.S. Cl. ........................ 29/898.08; 29/724; 29/256; 29/258; 29/264; 29/266; 29/270; 29/271

(58) Field of Search .......................... 29/724, 725, 244, 29/254, 256, 258, 263, 264, 266, 270, 271, 275, 255, 259, 898.08

(56) References Cited

U.S. PATENT DOCUMENTS

| | | | | | |
|---|---|---|---|---|---|
| 1,320,378 | A | * | 11/1919 | Burdette | 29/244 |
| 1,381,101 | A | * | 6/1921 | Albertosn | 29/263 |
| 1,466,976 | A | * | 9/1923 | Tracy | 29/266 |
| 1,550,802 | A | * | 8/1925 | Hampton et al. | 29/264 |
| 1,599,332 | A | * | 9/1926 | Kerr | 29/263 |
| 1,705,789 | A | * | 3/1929 | Steirly | 29/266 |
| 3,863,322 | A | * | 2/1975 | Russell | 29/283 |
| 4,001,927 | A | | 1/1977 | Enderle | |
| 4,173,813 | A | * | 11/1979 | Stockinger | 29/266 |
| 4,233,864 | A | | 11/1980 | Gutierrez | |
| 4,724,608 | A | * | 2/1988 | Parrott | 29/724 |
| 4,769,890 | A | * | 9/1988 | Maynard | 29/259 |
| 4,977,661 | A | | 12/1990 | Wood | |
| 5,165,169 | A | * | 11/1992 | Boyce | 29/898.08 |
| 5,271,633 | A | | 12/1993 | Hill, Jr. | |
| 5,355,574 | A | | 10/1994 | Zweekly et al. | |
| 5,509,186 | A | | 4/1996 | Straut | |
| 5,692,437 | A | | 12/1997 | Tabain | |
| RE36,009 | E | * | 12/1998 | Shultz | 29/898.08 |
| 5,848,460 | A | | 12/1998 | Rasmussen et al. | |
| 5,894,665 | A | | 4/1999 | Olmsted | |
| 5,991,994 | A | | 11/1999 | Crews | |
| 6,032,364 | A | * | 3/2000 | De Marchi | 29/898.08 |
| 6,088,898 | A | | 7/2000 | Lundsten | |
| 6,092,279 | A | | 7/2000 | Shoup | |
| 6,158,110 | A | * | 12/2000 | Takacs | 29/724 |
| 6,182,353 | B1 | * | 2/2001 | Grunze et al. | 29/724 |
| 6,212,775 | B1 | * | 4/2001 | Sarver et al. | 29/898.08 |
| 6,401,338 | B1 | * | 6/2002 | Hill et al. | 29/898.08 |

* cited by examiner

*Primary Examiner*—Gregory Vidovich
*Assistant Examiner*—Essama Omgba
(74) *Attorney, Agent, or Firm*—Roger N. Chauza, Esq.; Chauza & Handley, LLP

(57) ABSTRACT

A tool for extracting a bearing race from a bearing support structure. The tool is sufficiently narrow for sideways insertion into the bearing race. The tool can then be rotated within the race so that the tool engages with an annular flange of the bearing race. A threaded bolt engaged in a threaded bore of the tool is used to extract the bearing race from the support structure.

17 Claims, 5 Drawing Sheets

TOOL FOR EXTRACTING A BEARING

RELATED APPLICATION

This application claims the benefit of pending provisional patent application filed Jul. 10, 2001, accorded Ser. No. 60/304,106 and entitled “Tool For Extracting a Bearing.” The disclosure of the provisional patent application is incorporated herein by reference.

TECHNICAL FIELD OF THE INVENTION

The present invention relates in general to mechanical tools, and more particularly to a tool for extracting a bearing mounted within an opening.

BACKGROUND OF THE INVENTION

Bearings of all types are employed in many different applications for allowing one part to rotate with respect to another part, without incurring substantial wear between the parts. According to the different applications, bearings may be of the roller, ball, needle or other type.

Now and then it happens that bearings wear out or are otherwise destroyed, either because of inadequate lubrication or the presence of abrasive particles in the lubrication, or both. When this occurs, the bearing can fail and must be replaced. The failure mode of roller or ball-type bearings is generally the destruction of the roller or ball itself. For the part of the bearing that remains on the shaft, a conventional bearing puller can be used to remove such part. The other part of the bearing, termed the “race”, is held within the opening of a plate or other support structure. In some instances, the race can be removed by simply hammering on the race with a cylindrical object to push the race through the opening in the plate structure. Often, this procedure cannot be carried out because when doing so, the damaged race cannot be easily accessed and retrieved from the plate structure. Also, some bearings are housed in plate structures where the race must be inserted and removed only from the frontal side of the plate structure.

There are various complicated bearing removable structures which are either costly or complicated to utilize. In addition, many applications may be addressed by utilizing a special fitting to pump a grease, or similar substance, behind the bearing to thereby force the race in a forward direction and remove the same from the plate structure.

It can be seen from the foregoing that a need exists for a tool of low cost and uncomplicated nature that facilitates the removal of a damaged bearing race from the opening in a plate structure.

SUMMARY OF THE INVENTION

In accordance with the principles and concepts of the invention, there is disclosed a tool adapted for removing a bearing race captured within a plate structure.

The bearing removal tool constitutes an internally threaded nut, or similar article, of a shape and size which cannot otherwise be passed through the central opening in the bearing race when oriented transverse thereto. The threaded nut is formed so as to have flat surfaces on two opposite sides thereof to reduce the width of the tool. The nut is thus somewhat elongate and terminates in opposing ends. The threaded nut is also machined so as to have a taper formed on at least one end so that the threaded nut can be oriented in an oblique manner and passed into the central portion of the bearing race, turned somewhat so as to be transverse, and then be moved forwardly inside the race into engagement with an inwardly-directed angular flange of the race. A bolt or other threaded rod can be threaded into the tapered nut until the end of the bolt abuts against an internal surface of the plate structure. By continued rotation of the bolt, the nut moves outwardly, bringing with it the bearing race.

Alternatively, the bolt or threaded rod can be connected to a slam hammer and knocked forwardly to remove the bearing race.

The tapered nut provides an uncomplicated structure for manufacture at a cost effective price.

BRIEF DESCRIPTION OF THE DRAWINGS

Features and advantages will become apparent from the following and more particular description of the preferred and other embodiments of the invention, as illustrated in the accompanying drawings, in which like reference characters generally refer to the same parts or elements throughout the views, and in which.

DETAILED DESCRIPTION OF THE INVENTION

Figure 1:
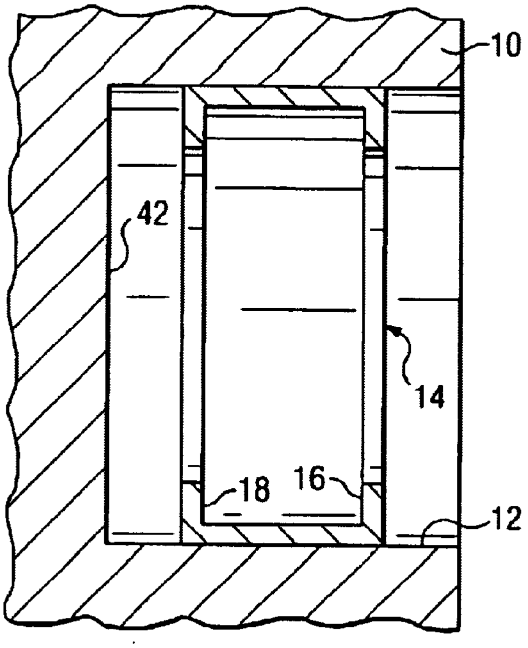
FIG. 1 is a cross-sectional view that shows a plate structure having an opening into which a bearing race is lodged.

FIG. 1 illustrates a typical application in which the bearing extraction tool of the invention can be utilized. In many instances, a plate or frame structure 10 includes a bore or recessed area 12 for holding a bearing, the race portion 14 of which is shown in FIG. 1. The recessed portion 12 in the plate structure 10 is formed deep enough to fully insert the bearing race 14 therein. In typical applications, the entire bearing, and not just the race, is press fit into the recess 12.

Figure 2:
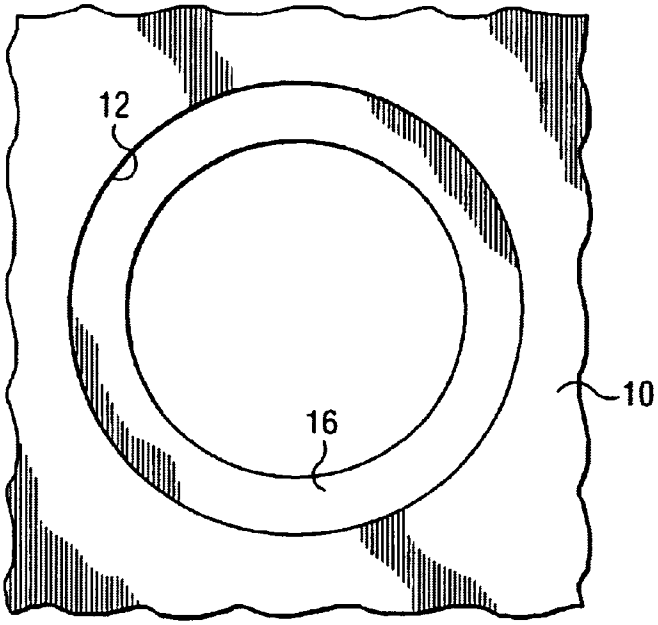
FIG. 2 is a frontal view of the plate structure and bearing race of FIG. 1.

FIG. 2 shows a frontal view of the structure shown in FIG. 1. The bearing race 14 includes an annular inwardly-directed flange 16 formed around the frontal edge of the race 14. A similar flange 18 is formed at the rear part of the bearing race 14. The flanges 16 and 18 are utilized to maintain the needle bearings or other type of bearing structures rotatable therein.

Figure 3:
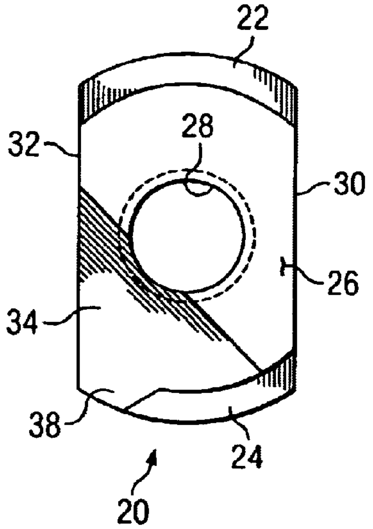
FIG. 3 is a frontal view of the bearing race removal tool according to one embodiment.

FIG. 3 illustrates a frontal view of the bearing extraction tool 20 constructed according to one embodiment of the invention.

Figure 4:
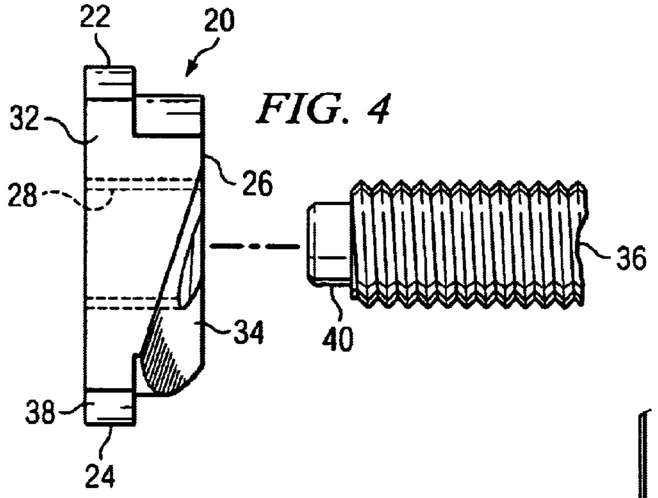
FIG. 4 is a left side view of the tool of FIG. 3.

FIG. 4 illustrates a left side view of the bearing extraction tool 20. The tool 20 can be fabricated by using a conventional nut and machining the same so as to be configured like that shown in FIGS. 3 and 4. Otherwise, the tool 20 can be machined from round stock, or otherwise forged or cast in shapes described herein. The tool 20 includes a first arcuate shoulder 22 and a second arcuate shoulder 24. The shoulders 22 and 24 are formed on opposite ends of the elongate body 26 of the tool 20. The opposing shoulders 22 and 24 function to engage with the inside surface of the frontal flange 16 of the bearing race 14. A threaded bore 28 is formed through the center of the tool 20.

The tool 20 includes opposing planar side faces 30 and 32 to provide a narrow width to the tool 20 so that it can be oriented sideways and inserted axially into the frontal opening of the bearing race 14. In this orientation, the axis of the tool 20 extending through the threaded bore 28 is generally perpendicular to the axial axis of the bearing race 14.

In accordance with an important feature of the invention, the tool 20 includes a beveled surface 34 to allow the tool 20 to be rotated from an axial position to a transverse position when disposed within the bearing race 14. A bolt 36 can then be threaded through the threaded bore 28 of the tool 20. A portion 38 of one shoulder 24 may also require the formation of a tapered surface thereon to allow the tool 20 be rotated while disposed within the bearing race 14.

The insertion of the tool 20 into the bearing race 14 is carried out in the following manner. First, the bolt 36 is removed from the tool 20. Then, the tool 20 is rotated so that the shoulder 24 adjacent the beveled surface 34 is pointed or otherwise oriented toward the frontal opening of the bearing race 14. Next, the tool 20 is inserted in a sideways manner midway into the bearing race 14, and then rotated so that the axial axis of the tool 20 is aligned with the axial axis of the bearing race 14. In this position, the tool 20 is positioned transverse within the bearing race 14, between the frontal and rear race flanges 16 and 18. The bolt 36 is next threaded into the internal threads 28 of the tool 20. The tool 20 is then pulled forwardly by the bolt 36 so that the shoulders 22 and 24 of the tool 20 engage the inside surfaces of the frontal annular flange 14. The bolt 36 is then rotated. When the threaded end 40 of the bolt 36 engages the inside surface 42 of the recessed bore 12, the tool 20 is forced outwardly, bringing with it the bearing race 14. The rotation of the bolt 36 is continued until the bearing race 14 has been completely removed from the plate structure 10.

It can be seen from the foregoing, the manner in which this uncomplicated and cost-effective tool 20 can be easily utilized to remove a bearing race from a plate structure.

Figure 5:
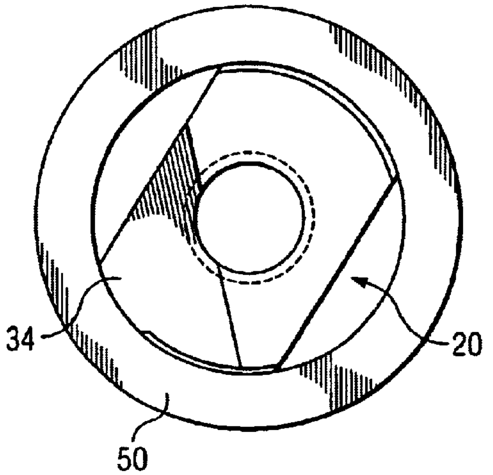
FIG. 5 is a frontal view of the bearing tool as engaged within a race to be removed.

FIGS. 5–11 illustrate further diagrams of the details of the bearing extracting tool 20 constructed according to the invention. In FIG. 5, the tool 20 is shown fully engaged in a transverse position within in a race 50 and ready for a bolt 36 to be threaded therein.

Figure 6:
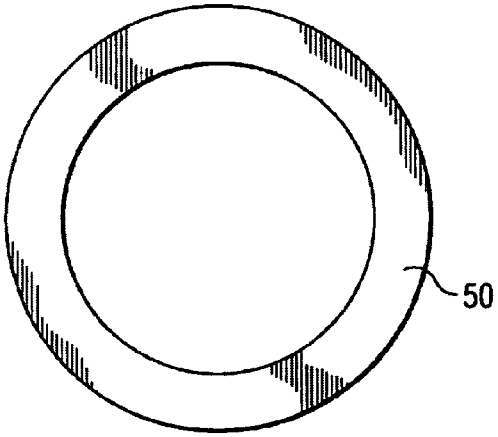
FIG. 6 is a frontal view of a conventional bearing race.

FIG. 6 illustrates a conventional bearing race 50 without the insertion of the tool 20 therein.

Figure 7:
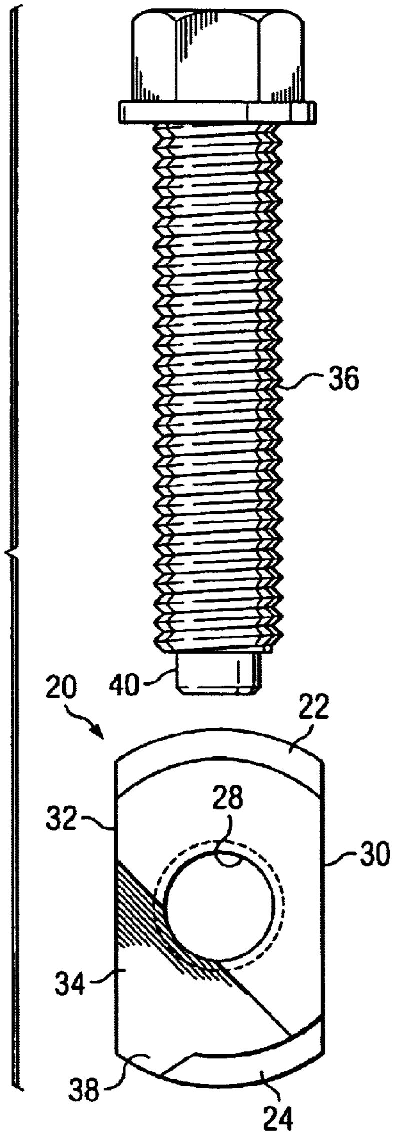
FIGS. 7–10 are various views of the bearing removal tool and a corresponding bolt that can be threaded into the tool.

In FIG. 7, there is illustrated the bolt 36 and the frontal view of the bearing removal tool 20.

Figure 8:
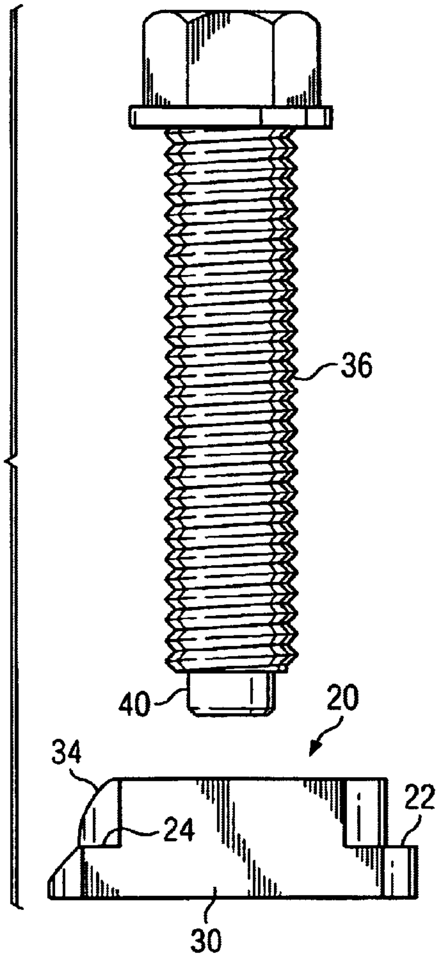
Figure 9:
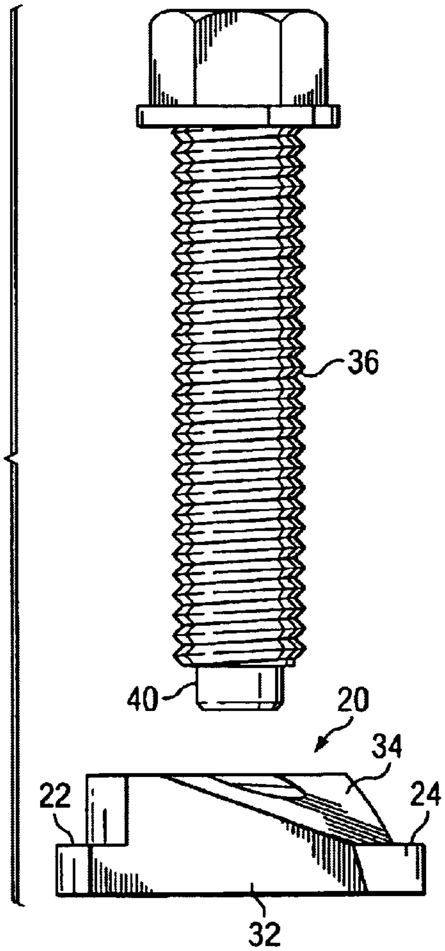
Figure 10:
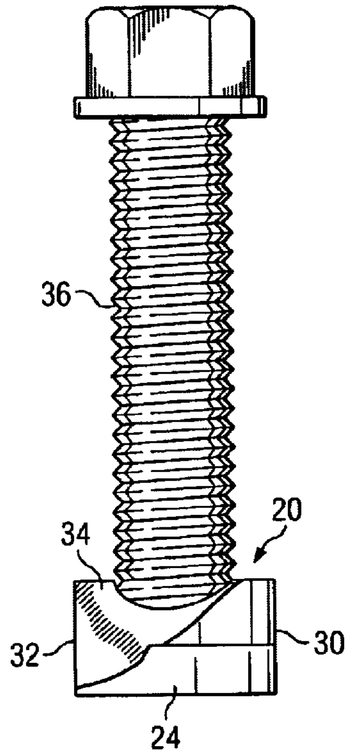

In FIG. 8, the tool 20 is shown removed from the bolt 36. The tool 20 is shown from a right side view thereof, as compared to FIG. 3. A left side of the tool 20 is shown in FIG. 9. In FIG. 10, the tool 20 is shown with the beveled surface 34 and corresponding shoulder 24.

Figure 11:
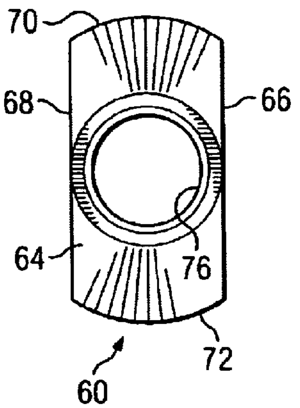
FIG. 11 is a back view of another embodiment of the bearing removal tool constructed according to the invention.
Figure 12:
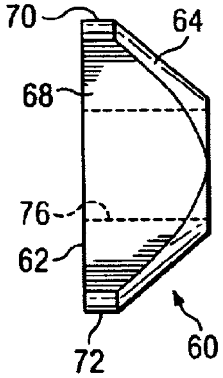
FIG. 12 is a side view of the tool shown in FIG. 11.
Figure 13:
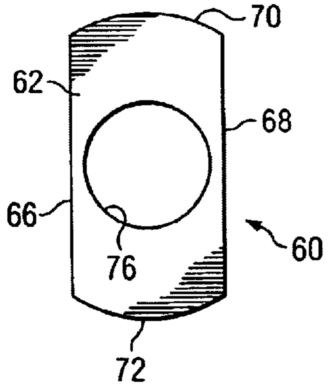
FIG. 13 is a frontal view of the tool of FIG. 11.

FIGS. 11–13 illustrate another embodiment of the bearing extraction tool of the invention. In this embodiment, the tool 60 is formed with a frontal flat surface 62 and a rear conical-shaped surface 64. Much like the tool 20 of the first embodiment, opposing flat side surfaces 66 and 68 are formed on the tool 60. The tool 60 has rounded ends 70 and 72. A threaded bore 76 is formed axially through the tool 60.

In the fabrication of the tool 60, round tubular stock of rolled steel is employed. The stock is cut to a width corresponding to the left-right dimension shown in FIG. 12. The workpiece is then placed in a screw machine to form the conical-shaped surface 64. A bore is drilled therein and threaded to form the threaded bore 76. Lastly, the device is placed in a lathe to form the opposing side surfaces 66 and 68. The entire operation may take about 4–5 seconds. Many other methods of fabrication can be used, such as forging or casting the tool 60.

Figure 14:
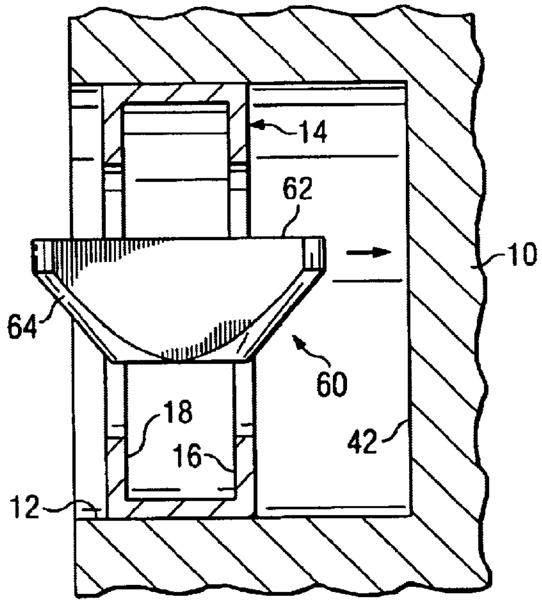
FIGS. 14–17 are sequential side views of the orientation of the tool as it is moved into the bearing race for engagement thereof.
Figure 15:
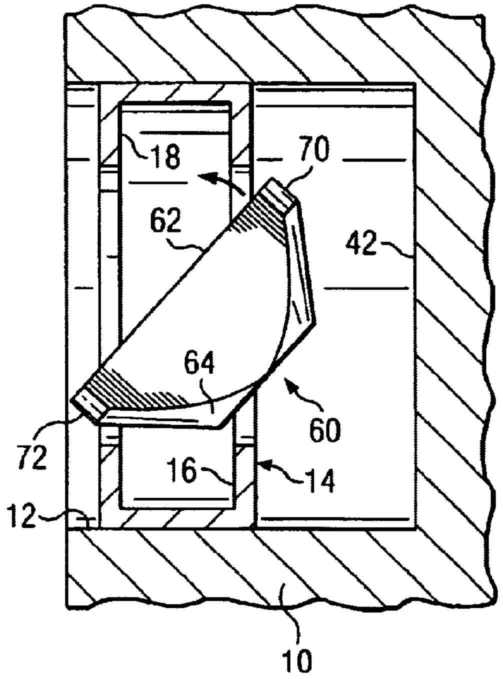
Figure 16:
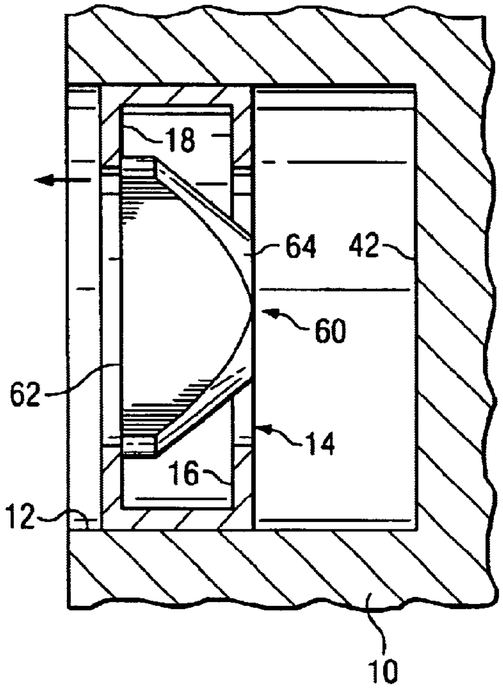
Figure 17:
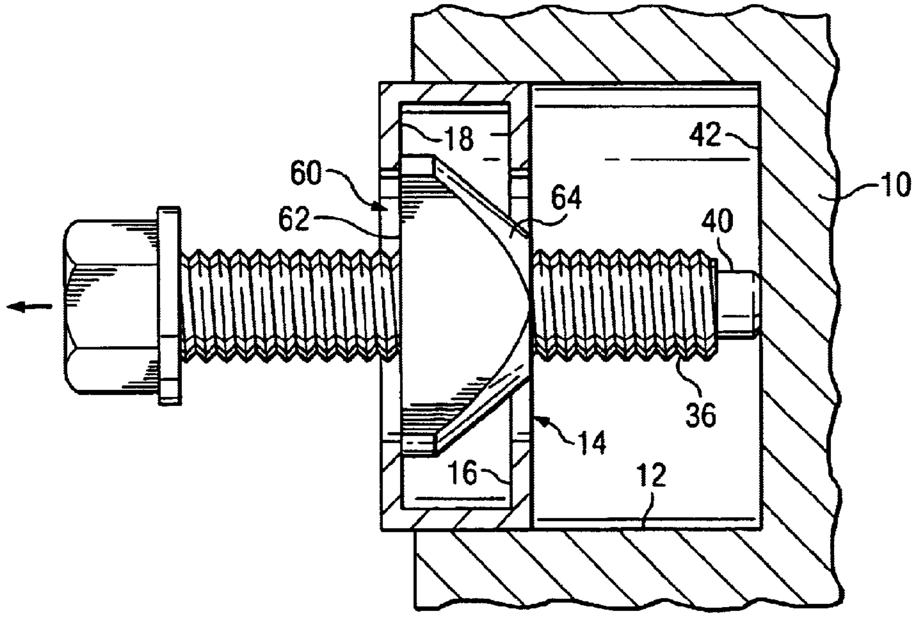

The method of use of the tool 60 is shown in FIGS. 14–17. The tool 60 is first oriented so that the elongate shape of the tool 60 can be inserted into the opening of the bearing race 14, as shown in FIG. 14. In this instance, the frontal side 62 of the tool 60 is facing upwardly. When the tool 60 is oriented inside the bearing race 14, it is rotated, as shown in FIG. 15. The conical surface 64 allows the tool 60 to move past the annular edges of the race flanges 16 and 18, while the annular ends 70 and 72 of the tool 60 pass beyond the respective race flanges 16 and 18. Once the tool 60 is rotated so that the axial axis of the bore 76 is parallel with the axial axis of the bearing race 14, as shown in FIG. 16, the bolt 36 is threaded into the tool 60. In this orientation, the flat frontal face 62 of the tool 60 engages the inside surface of the bearing race flange 18. Continued rotation of the bolt 36 causes the end 40 thereof to engage the inside surface 42 of the bearing support recess 12. This action forces the tool 60 outwardly, carrying with it the bearing race 14. As such, the bearing race 14 can be easily removed. The bolt 36 can be removed from the tool 60. The tool 60 can be removed from the race 14 so that the race 14 can be discarded. The tool 60 can be used again for another removal of a bearing race 14.

It can be seen that tools 60 of different sizes can be employed for use with bearing races of different sizes. It should also be understood that while the tool 60 is shown with two partial conical surfaces 64, only one is necessary. However, by forming the tool 60 with two partial conical surfaces, the tool 60 can be inserted with the flat frontal surface 62 oriented either up or down, whereupon the tool 60 is rotated either counterclockwise or clockwise. In practice, the flat frontal surface 62 of the tool 60 can be oriented into the race 14 in any orientation, and rotated in the appropriate direction so that the flat frontal face 62 ends up facing toward the front of the bearing race 14.

Those skilled in the art may prefer to insert the tool 60 fully through the race 14, and rotate it so that the flat surface 62 engages the inside flange 16 of the race 14. The race 14 can be removed by this optional technique. In addition, the bearing extraction tools disclosed herein can be used for removing the entire bearing, rather than just the race.

From the foregoing, bearing extraction tools constructed according to the invention have been described and illustrated. The tool simplifies and facilitates the removal of a bearing or a bearing race from difficult locations, such as within a bore of a plate structure.

Although a preferred and other embodiments of the invention have been disclosed with reference to specific bearing extraction tool devices, and methods of operation thereof, it is to be understood that changes in detail may be made as a matter of engineering choices, without departing from the spirit and scope of the invention, as defined by the appended claims.

What is claimed is:

1. A tool for extracting at least a bearing component held within a bearing support, comprising:

an elongate tool body having a width along a minor axis, and a length along a major axis, said minor and major axes being orthogonal, and said major axis of said tool body being longer than said minor axis, the width of said tool body being shorter than a diameter of the opening in said bearing component, and the length of said tool body being longer than the diameter of the opening of the bearing component, wherein said tool body can be inserted in one direction into the opening of said bearing component, rotated and moved in an opposite direction to engage the bearing component for extraction thereof from the bearing support;

said tool body having opposing ends on the major axis, each said opposing end defining a partial arc; and a threaded bore formed in said tool body along a bore axis perpendicular to the major axis and the minor axis.

2. The tool of claim 1, wherein said tool body includes a frontal surface having a shape defined by a portion of a circle encompassed by two opposing said partial arcs and two parallel lines cutting through said portion of the circle.

3. The tool of claim 1, wherein said bearing support has at least one tapered surface that extends from a location proximate one said end and extending toward the bore axis.

4. The tool of claim 3, wherein said bolt has a length sufficient for an end thereof to engage a surface of said bearing support.

5. The tool of claim 1, further including in combination a threaded bolt for threaded engagement with said threaded bore.

6. The tool of claim 1 fabricated by a method including using rod-like stock and forming a tapered surface tapering inwardly toward an axis of the rod-like stock, forming a threaded bore along the axis of the rod-like stock, and forming parallel planar faces on said tool parallel to the axis of the rod-like stock.

7. The tool of claim 1, further including in combination a bolt engageable with said threaded bore, and a bearing for replacement with a damaged bearing removed from said support structure.

8. The tool of claim 1, wherein each said partial arc is shaped so as to have a respective radial center where the major and minor axes intersect.

9. A tool for extracting a bearing component including a race, said bearing component of the type having a circular opening therethrough, said tool comprising:

a body having a threaded bore, said body having a pair of opposing ends adapted for engaging an annular flange of the bearing race;

said body having a width for allowing sideways insertion of the tool into a circular opening of the bearing race when an axis of the threaded bore is generally perpendicular to an axis of the circular opening of the bearing race; and said body having a tapered surface for allowing rotation of the body while disposed within said bearing race.

10. The tool of claim 9, wherein said ends include shoulders formed as recessed areas in the shape of an arc.

11. The tool of claim 10, wherein a depth of the recessed areas is about the same as the width of a flange of a bearing race.

12. The tool of claim 9, wherein said body includes planar sides to provide a width of said tool suitable for sideways insertion thereof into the bearing race.

13. The tool of claim 9, further including in combination a threaded bolt for threadable engagement with the threaded bore of said body.

14. A method of extracting a bearing component from a bearing support, comprising the steps of:

using a tool having a threaded bore, and orienting the tool sideways such that an axial axis through the threaded bore is generally perpendicular to an axial axis of the bearing component;

moving the sideways oriented tool in one direction generally parallel to the axial axis of the bearing component;

rotating the tool so that the axial axis of the tool is generally parallel to the axial axis of the bearing component;

moving the tool in a direction opposite to said one direction until the tool engages the bearing component;

threading a bolt into the threaded bore of said tool, rotating the bolt and moving the bolt in a direction until an end of the bolt abuts with an object; and moving the tool with continued rotation of the bolt, and carrying the bearing component with the tool until the bearing component is extracted from said bearing support.

15. The method of claim 14, further including rotating the tool while within the bearing component.

16. The method of claim 15, further including positioning the tool within the bearing component during extraction thereof.

17. The method of claim 14, wherein said bearing component includes a bearing race with annular flanges, and engaging the tool with an inside surface of one said annular flange.

* * * * *